April 19, 1927.
F. W. HENKE, JR
1,625,658
AUTOMOBILE TIRE LOCK
Filed Jan. 21, 1926
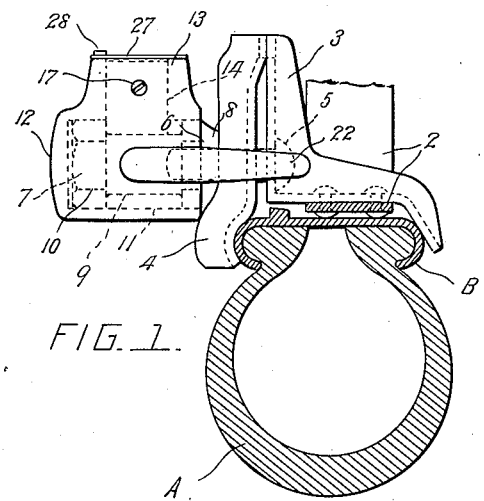
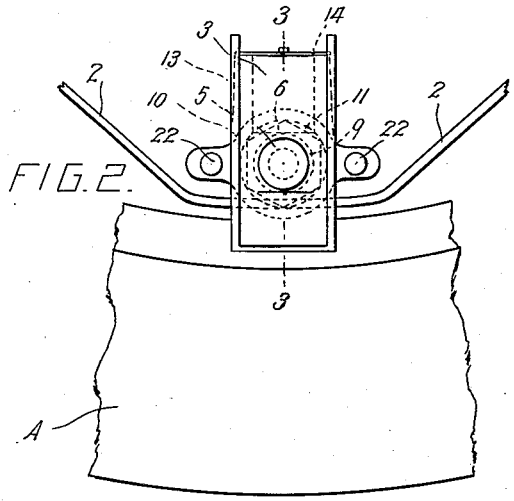
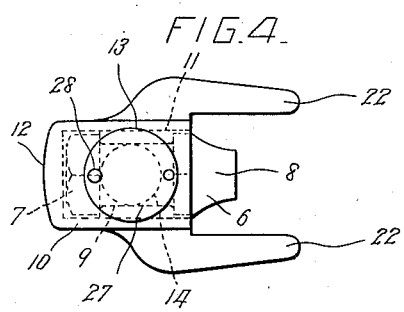
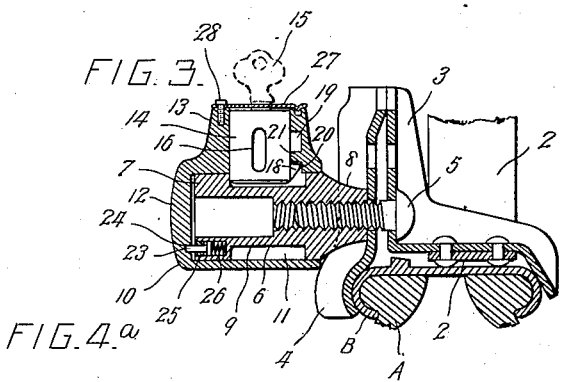
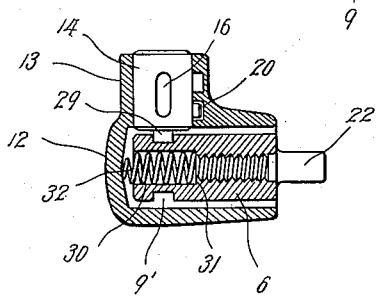
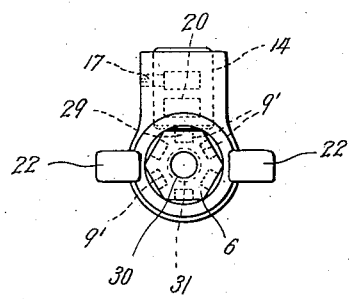
Inventor
Frederick W. Henke Jr.
By John S. Barker
Attorney Patented Apr. 19, 1927.

1,625,658

UNITED STATES PATENT OFFICE.

FREDERICK W. HENKE, JR., OF PHILADELPHIA, PENNSYLVANIA, ASSIGNOR TO FOX AUTOMOTIVE PRODUCTS CORPORATION, OF PHILADELPHIA, PENNSYLVANIA, A CORPORATION OF DELAWARE.

AUTOMOBILE TIRE LOCK.

Application filed January 21, 1926. Serial No. 82,754.

My invention relates to locks for spare tires and has for its object to improve the same, making them simple in construction and operation, certain and secure in operation, and with improved features which will be hereinafter pointed out.

In the accompanying drawings, in which preferred forms of my invention are illustrated,—

Figure 1 is a cross sectional view taken through a portion of a spare tire and tire carrier and illustrating my lock in side elevation and in position for use.

Fig. 2 is a rear view of parts illustrated in Fig. 1.

Fig. 3 is a central vertical sectional view taken on the line III—III of Fig. 2.

Fig. 4 is a top plan view of parts of the lock separate from the parts with which it is associated when in use.

Fig. 4ª is an elevation of the nut 6, detached.

Fig. 5 is a central, longitudinal, sectional view of another embodiment of my invention.

Fig. 6 is an end view of the form of invention shown in Fig. 5.

In the accompanying drawings A designates a spare tire and B the rim upon which it is supported, these being of any usual construction and being typical of an article or articles to be held secure against theft or other loss by the use of my invention.

2 indicates a ring or holder for a spare tire, such as is commonly found at the rear of an automobile. To this holder is riveted or otherwise secured a bracket 3 from which extends outwardly a screw-threaded bolt or pin 5 that passes freely through an opening in a clamp piece 4, adapted to engage with the tire rim B and hold it and the tire in place upon the support 2. The parts thus far described are of well known construction and are standard equipment upon many automobiles. They may be widely varied in details of construction, so far as my invention is concerned.

6 indicates a nut adapted to engage with the bolt 5, and hold the clamp 4 in place against the rim of the tire, as represented in Fig. 1 of the drawings. This nut is of peculiar construction, being of unusual length as compared with ordinary machine nuts, and having a head, 7, shaped to fit a wrench at one end, and a head, 8, with a tapering face adapted to engage with the clamp piece 4, at the other end.

I prefer to shape the head 8 as indicated in the drawings, so that the reduced end portion thereof is adapted to engage with the clamp piece 4 between the side flanges thereof. Between the heads 7 and 8 of the nut is a centrally recessed portion 9 which in the form of invention illustrated in Figs. 1 to 4 is a rather wide annular groove.

10 designates a removable housing, preferably formed of hard tool-resisting steel, adapted to be applied to and cover the nut 6 after this has been screwed to place to hold the tire upon the ring 2. This housing is formed with an interior chamber 11 of a size to accommodate rather closely the nut 6. The outer end of this chamber is closed by an integral part of the housing constituting an end plate 12. At one side of the housing there is formed an extension 13 constituting a lock casing which is preferably integral with the housing. In this casing is seated the body 14 of a lock, which may be of any suitable and desired construction—that illustrated being of the pin tumbler type, having a cylindrical body, and arranged to be operated by a key 15. The axis of the chamber in which this lock is seated, is preferably radial to the chamber 11.

In the peripheral surface of the lock body there is formed a longitudinal slot 16 into which extends the end of a pin 17 that is set into the extension 13 of the housing. This arrangement serves to secure the lock against loss or accidental displacement from its seat in the housing, but permits it to have a certain amount of movement radially toward and from the nut 6. When the lock body is moved inwardly the inner end thereof enters the recessed part 9 of the nut, and so long as it is maintained in such inner position the housing is thereby secured to the nut and held against removal therefrom. When the recess 9 is a continuous peripheral groove the housing is free to turn upon the nut, notwithstanding the engagement of the lock with the nut.

18 represents a spring plunger of the lock, radially movable in the casing thereof, being normally held with its outer end projecting beyond the peripheral face of the casing by the spring, not shown, within the lock casing, but adapted to be retracted within the casing by the use of the key 15. The forward face of the plunger is preferably beveled, as represented in Fig. 3.

The inner wall of the lock chamber has formed in it a recess 20 adapted to receive the plunger 18 when the lock body is moved to its inner position in engagement with the nut. There is another recess, 19, formed in the wall of the lock chamber, into which the plunger is adapted to enter when the lock body is moved to its outer position and free from the nut. Between the recesses 19 and 20 is a rib or partition 21 over which the plunger 18 must pass in moving from one position to the other. By making the end of the plunger beveled the lock body may be moved from its outermost to its innermost position without requiring the use of the key 15, as the plunger will ride over the partition 21; but reverse movement of the lock cannot take place except by the use of the key, as is apparent.

The end of the lock may be covered by a plate 27 which is pivotally united to the extension 13 of the housing by a pivot 28.

I prefer that the housing when applied to the nut should be held so that it cannot turn, to any substantial extent, relative to the nut. To this end I have represented the housing as being formed with a pair of forwardly extending arms 22 that are adapted to embrace the clamp 4 when the housing is applied to the nut. This engagement of the housing with a fixed or rigid member prevents any turning of the housing after it is in place, either relative to the nut 6 or together therewith. The shape and disposition of the arms 22, as represented in the drawings, is incidental to the particular use for which the particular article embodying my invention may be intended; and hence the number of arms 22, their shape and their disposition may be varied from what is shown, the illustration being typical although practical and adapted for use as a spare tire lock in connection with the equipment of very many automobiles now on the market.

In order to prevent movement of the housing after it has been applied and the rattling of parts, I provide means which preferably come into automatic operation when the housing is applied. As represented in Fig. 3 such means consist of a spring plunger 23 seated in a recess formed therefor in the head 7 of the nut. The plunger is supported and guided by a bushing 25 set in the said recess, and is acted upon by a spring 26 that tends to move it outwardly. The free outer end of the plunger is adapted to enter a recess 24 formed therefor in the end plate 12 of the housing.

In Figs. 5 and 6 I have represented a form of my invention differing in detail from that described. As there represented the nut 6 is formed with a circular series of peripheral recesses 9' with which is adapted to engage a stud or boss 29 at the inner end of the lock body 14. With this arrangement the bolt and housing are united, not only against separation but against rotary movement of one part relative to the other, whenever the lock body is moved into its inner holding position. With this form of lock it is very essential that the housing should be provided with means, such as the arms 22, for preventing the turning of the housing after it has been applied to the nut. In this view I also show another means for preventing rattling of the housing. As represented the nut is provided with an axial opening, 30, in alignment with and beyond the screw-threaded opening for the bolt 5, and preferably of a larger diameter than said screw-threaded opening, so as to constitute a shoulder or seat 31. In this axial opening, and resting upon the shoulder 31 is a coiled spring 32, of a length such that it extends beyond the end of the nut and is adapted to engage with the end plate of the housing when the latter is slipped over the nut to locking position.

The operation of the invention which has been described will be easily understood. After the spare tire has been placed upon the holder 2 the clamp and securing nut 6 are applied, the latter being screwed upon the bolt 5 until the clamp is properly tightened upon the tire rim. The housing is then slipped over the nut, the lock body 14 being in its outermost position. The lock body is next moved inwardly to its innermost position, bringing the inner end thereof into engagement with the centrally recessed part of the nut, thus uniting these parts, in which position they are held by the plunger of the lock occupying the recess 20. As the housing comes to locking position the anti-rattling device, whether the plunger 23 or the spring 32, comes into operation and functions. When it is desired to remove the spare tire all that is necessary is that the lock should be operated by the key 15 and the body or casing 12 thereof moved outwardly, freeing the housing, after which it is removed, exposing the nut and leaving it free to be manipulated by a wrench.

The spring 23 serves not only as an anti-rattling device but also as a detent to prevent rotative movement of the nut relative to the housing. It sometimes happens that the securing nut 6 is not screwed tightly to place before the housing is applied. In that event it might be that the nut would tend to turn and back off from the bolt 5 due to the jarring movements to which the parts are subjected, were no provision made to prevent this. However, as stated, the spring plunger 23 serves as a detent, carried by the nut and engaging with the housing, which latter is held against turning about the axis of the nut, to prevent turning of the nut.

I have illustrated my invention in connection with a lock for spare tires, but many of the features thereof are adapted for other uses, and in another application of even date herewith bearing Serial No. 82,753 I have illustrated, described and claimed one embodiment of the features of invention claimed in this case in a lock for spare wheels, particularly disk wheels, of automobiles.

What I claim is:

1. The combination with a securing nut having a head of standard construction adapted to be engaged by a wrench, of a housing adapted to enclose the nut, a lock casing carried by the housing, and a lock the body of which is mounted in the lock casing and is therein movable radially relative to the nut to engage therewith to prevent separation of the nut and housing, the lock having key-operated parts to engage with the lock casing and hold the lock body in engagement with the nut until released through the operation of the key.

2. The combination of a securing nut, having a head of standard construction to be engaged by a wrench and an intermediate recessed portion, a housing adapted to enclose the nut, a lock casing carried by the housing, the inner end of such casing opening into the chamber of the housing, and a lock the body of which is mounted in the lock casing and is therein movable bodily so as to engage directly with the intermediate recessed portion of the nut when moved inwardly, the lock having key-operated parts to hold the lock body in engagement with the nut until released through the operation of the key.

3. In means for locking a spare tire to a carrier, the combination with a holder for the tire, a threaded bolt and a clamp that passes over the bolt and operates to confine the tire upon the holder, of a nut adapted to engage with the threaded bolt and bear upon the clamp, a housing open at one end adapted to pass endwise over the nut and enclose the same, a key-operated lock carried by the housing and adapted to engage with the nut to prevent endwise separation of the housing from the nut, and arms extending from the housing adapted to straddle the clamp and a fixed portion of the holder for the tire when the housing is applied and thereby prevent turning movement of the housing.

4. The combination of a securing nut having a long body that is externally recessed and a housing constructed to fit over the nut and enclose the same, the housing having an end wall closing the cavity which the nut occupies, a lateral extension in which is located a key-operated lock, the lock having a part adapted to engage with the recessed portion of the nut to prevent removal of the housing from the nut without proper manipulation of the lock, and a rigid arm extending from the housing and adapted to engage with some fixed part to prevent turning of the housing after being locked to the nut.

5. The combination with a securing nut, of a housing open at one end and adapted to be applied endwise to the nut, means for securing the housing to the nut to prevent endwise separation thereof, and spring operating means to prevent rattling of the housing after it has been applied.

6. The combination with a securing nut, of a housing therefor, adapted to cover the nut, means for preventing endwise separation of the housing from the nut, and anti-rattling devices concealed by the housing and arranged to prevent rattling of the latter after it has been applied to the nut.

7. The combination with a securing nut, of a housing therefor open at one end and closed at its opposite end, whereby it is adapted to be placed over the nut by endwise movement, means for securing the housing to the nut to prevent endwise separation thereof, and anti-rattling devices within the housing located between the housing and the nut.

8. The combination with a securing nut, of a housing therefor open at one end so that it may be passed over the nut by an endwise movement and closed at its opposite end, means uniting the housing and the nut to prevent endwise separation thereof, and a spring anti-rattling device mounted in the nut adapted to bear against the closed end of the housing.

9. The combination with a securing nut, of a housing therefor, open at one end to permit it to be slipped over the nut, and closed at its opposite end, means for securing together the nut and the housing to prevent endwise separation of these parts, and a spring plunger seated in the outer end of the nut and adapted to bear against the closed end of the housing when the latter is applied to the nut and serving to prevent rattling of the housing.

10. The combination with a securing nut, of a housing adapted to enclose the nut, means for securing the housing to the nut to prevent endwise separation thereof, means for preventing the housing from turning rotatively about the axis of the nut, and a detent interengaging between the nut and the housing for preventing rotative movement of the nut when covered by the housing.

11. The combination with a securing nut, of a housing adapted to cover the nut, means for securing the housing to the nut to prevent endwise separation of these parts, without interfering with the relative axial movements thereof, a spring detent between the nut and the housing serving as an anti-rattling device for the housing and also to prevent relative rotative movement of the nut after the housing has been applied thereto, and means for preventing any rotative movement of the housing after it has been secured to the nut.

FREDERICK W. HENKE, Jr.